(12) United States Patent
Desai et al.

(10) Patent No.: US 11,132,134 B2
(45) Date of Patent: Sep. 28, 2021

(54) FLEXIBLE OVER-PROVISIONING OF STORAGE SPACE WITHIN SOLID-STATE STORAGE DEVICES (SSDS)

(71) Applicant: Apple Inc., Cupertino, CA (US)

(72) Inventors: Meha N. Desai, Sunnyvale, CA (US); Eric B. Tamura, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 16/124,147

(22) Filed: Sep. 6, 2018

(65) Prior Publication Data

US 2019/0196732 A1 Jun. 27, 2019

Related U.S. Application Data

(60) Provisional application No. 62/609,233, filed on Dec. 21, 2017.

(51) Int. Cl.
*G06F 3/06* (2006.01)
*G06F 16/11* (2019.01)

(52) U.S. Cl.
CPC .......... *G06F 3/0631* (2013.01); *G06F 3/0604* (2013.01); *G06F 3/0643* (2013.01); *G06F 3/0679* (2013.01); *G06F 16/122* (2019.01)

(58) Field of Classification Search
CPC .... G06F 3/0631; G06F 3/0604; G06F 3/0643; G06F 3/0679; G06F 16/122
See application file for complete search history.

(56) References Cited

U.S. PATENT DOCUMENTS

| | | | |
|---|---|---|---|
| 6,591,334 B1* | 7/2003 | Shyam | G06F 3/0614 711/112 |
| 9,292,440 B2 | 3/2016 | Shalvi et al. | |
| 9,513,822 B2 | 12/2016 | Nazari et al. | |
| 9,792,172 B2 | 10/2017 | Kanno | |
| 2003/0217058 A1* | 11/2003 | Ladan-Mozes | G06F 16/1767 |
| 2010/0180209 A1* | 7/2010 | Yang | G06F 3/0683 715/748 |
| 2012/0096217 A1* | 4/2012 | Son | G06F 3/0616 711/103 |
| 2012/0131303 A1* | 5/2012 | Goebel | G06F 16/1727 711/171 |
| 2014/0006692 A1* | 1/2014 | Berntsen | G06F 21/77 711/103 |
| 2014/0281126 A1* | 9/2014 | Bleyer | G06F 3/0643 711/103 |
| 2018/0113875 A1* | 4/2018 | Jain | G06F 16/1847 |
| 2018/0285375 A1* | 10/2018 | Desai | G06F 12/1036 |
| 2019/0108122 A1* | 4/2019 | Nazari | G06F 3/0631 |

* cited by examiner

*Primary Examiner* — Nanci N Wong
(74) *Attorney, Agent, or Firm* — Dickinson Wright RLLP (57) ABSTRACT

The embodiments set forth a technique for over-provisioning storage space within a solid-state storage device (SSD). In particular, a file system can (1) receive a first request to create a file, where the first request includes a size for the file, (2) identifying at least one extent that corresponds to storage space within the SSD that satisfies the size for the file, and associating the file with the at least one extent to indicate that the storage space is occupied, (3) receive a second request to cause (i) the file to remain established within the file system, and (ii) the storage space to be marked free within the SSD, and (4) carrying out the second request by causing the storage space to be marked free within the SSD.

20 Claims, 5 Drawing Sheets

FIG. 1

Step 1: Example initial state of (i) File System (FS) Content, and (ii) Storage Device (SD) Allocation Structure

Step 2: Process a first request to establish a new file of a particular size within the file system volume

FLEXIBLE OVER-PROVISIONING OF STORAGE SPACE WITHIN SOLID-STATE STORAGE DEVICES (SSDS)

CROSS-REFERENCE TO RELATED APPLICATIONS

The present application claims the benefit of U.S. Provisional Application No. 62/609,233, entitled "FLEXIBLE OVER-PROVISIONING OF STORAGE SPACE WITHIN SOLID-STATE STORAGE DEVICES (SSDs)," filed Dec. 21, 2017, the content of which is incorporated herein by reference in its entirety for all purposes.

FIELD

The described embodiments relate generally to the management of storage space within solid-state storage devices (SSDs). More particularly, the described embodiments relate to enabling flexible over-provisioning of storage space within SSDs.

BACKGROUND

Solid-state drives (SSDs)—e.g., flash memory based devices—are similar to mechanical Hard Disk Drives (HDDs) in many aspects, including physical dimensions and external interfaces through which communications take place with host devices. However, the manner in which the internal components of SSDs are organized—and operate—are considerably different in comparison to HDDs. For example, as is well-known, the internal memory of a given HDD consists of a collection of magnetic disks onto which data is written and from which data is read. In contrast, the internal memory of a given SSD is organized into one or more dies, where each die is separated into a collection of planes. Additionally, each plane is separated into a collection of blocks, and each block is separated into a collection of pages onto which data is written and from which data is read.

Notably, when a write operation received by a given SSD involves overwriting existing data stored in one or more pages of a block, the entire block first needs to be erased due to physical of nature of the SSD's internal memory. In other words, the SSD cannot erase the pages within the block at a per-page level of granularity. In this regard, when performing the write operation, the SSD must implement specialized procedures to ensure that the existing data stored across the pages of the block—e.g., data that is not targeted by the write operation—is first migrated to another free area of storage space within the SSD for retention. In turn, the entire block can be erased, and the modified data can be written into the pages of the block. Additionally, the migrated data not targeted by the write operation—if any—can be migrated back into the block, or migrated to other free blocks if sufficient free storage space is no longer available within the block as a consequence of the write operation.

In view of the foregoing, it is important for a given SSD to possess a reserved area of internal memory to ensure that the SSD can remain capable of performing the aforementioned data migrations when carrying out write operations—a practice that is commonly referred to as "over-provisioning." In some cases, SSD manufacturers reserve a fixed area of internal memory prior to distributing their SSDs to customers. Alternatively, operating systems (OS) on computing devices within which the SSDs are placed can reserve fixed areas of memory, e.g., during formatting/OS installation procedures. In any case, it is noted that these fixed areas of memory typically are static in nature such that their overall sizes cannot be adjusted as performance requirements of the SSDs evolve over time. As a result, aggressive amounts of storage space are often reserved during over-provisioning to ensure continued operability. Unfortunately, this practice results in a deficiency in that the overall amount of free storage space available to end-users is substantially decreased, which impacts overall user satisfaction.

Accordingly, it is desirable to establish a technique that enables SSDs to be flexibly over-provisioned throughout their lifespans to accommodate evolving operating environments. In this manner, less-aggressive over-provisioning can be carried out at the onset of the SSDs operation—and subsequently increased/decreased, if necessary, to improve overall operational efficiency.

SUMMARY

Representative embodiments set forth herein disclose various techniques for enabling flexible over-provisioning of storage space within solid-state storage devices (SSDs).

According to some embodiments, a method for over-provisioning storage space within an SSD can be implemented by a file system executing on a computing device with which the SSD is communicably coupled. In particular, the method can include receiving a first request to create a file, where the first request includes a size for the file. Next, the method can include establishing the file within the file system by: (i) identifying at least one extent that corresponds to storage space within the SSD that satisfies the size for the file, and (ii) associating the file with the aforementioned extent to indicate that the storage space is occupied. Next, the method can include receiving a second request to cause (i) the file to remain established within the file system, and (ii) the storage space to be marked free within the SSD. Additionally, the method can include, for the aforementioned extent: issuing, to the SSD, a third request that causes the storage space to be marked free within the SSD. In this manner, the file remains allocated and established from the perspective of the file system, thereby preventing the storage space associated with the file from being re-used for storage of other files by the file system. Conversely, the storage space is free from the perspective of the SSD, thereby enabling the SSD to utilize the storage space for over-provision related operations without interference from the file system.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Representative embodiments disclosed herein set forth various techniques for enabling flexible over-provisioning of storage space within solid-state storage devices (SSDs). According to some embodiments, the techniques can involve establishing a new file—referred to herein as an "over-provisioning file"—of a particular size within a file system on a computing device. In particular, the size of the file can correspond to a desired amount of over-provisioned storage space to be established within an SSD with which the computing device is communicably coupled. In turn, the file system can update its configuration to retain the file, yet cause the SSD to free the storage space associated with the file. In this manner, the file remains established from the perspective of the file system, thereby preventing the storage space associated with the file from being utilized by the file system (e.g., to store new data). Conversely, the storage space is free from the perspective of the SSD, thereby enabling the SSD to utilize the storage space for over-provision related operations (e.g., cache space for overwrite operations, data organization, etc.) without interference from the file system. Additionally, at a later time, the size of the file can be modified to adjust the amount of over-provisioned storage space within the SSD using similar approaches, thereby achieving the flexible over-provisioning techniques described herein.

A more detailed discussion of these techniques is set forth below and described in conjunction with FIGS. 1, 2A-2B and 3-4, which illustrate detailed diagrams of systems and methods that can be used to implement these techniques.

Figure 1:
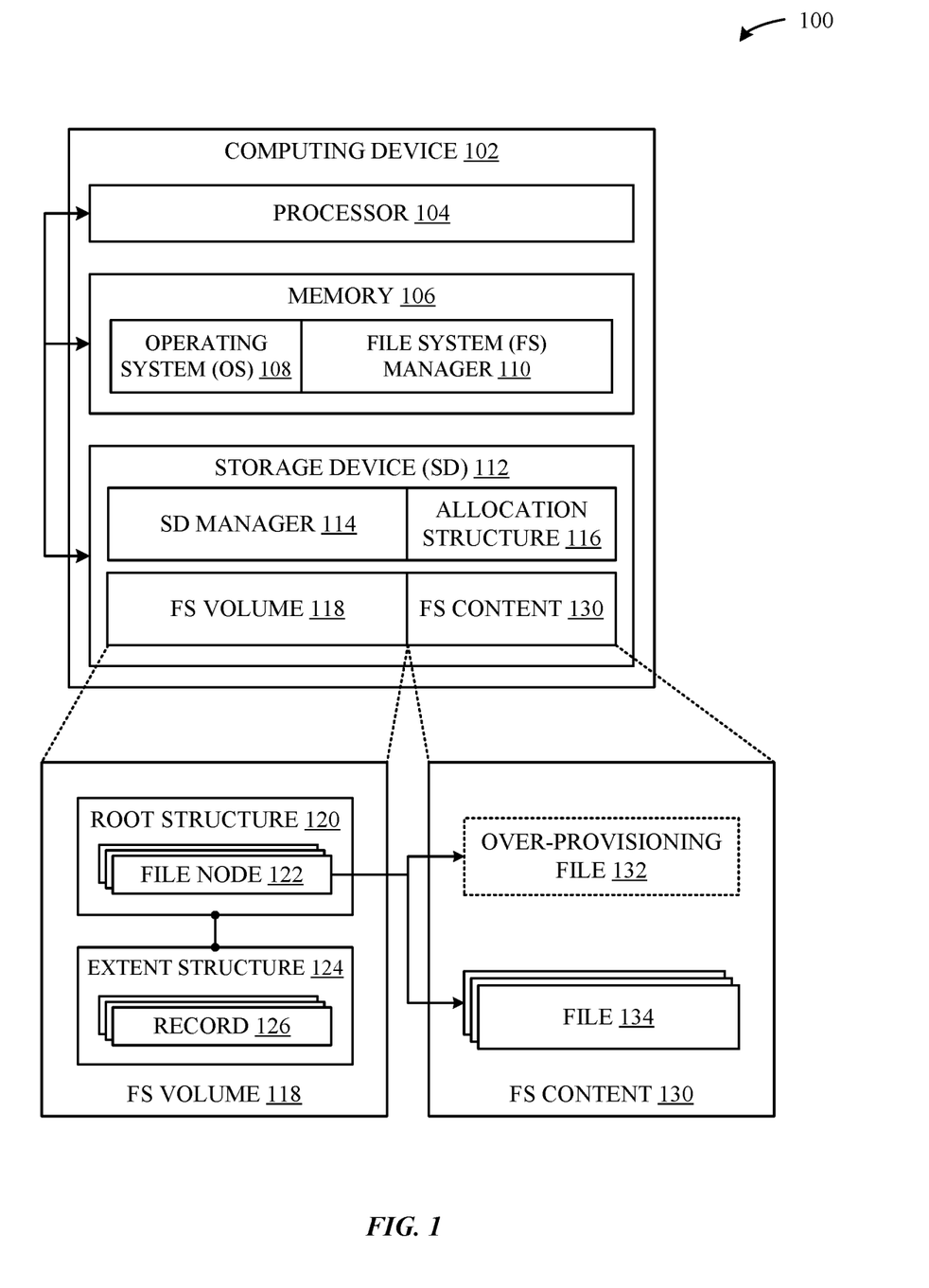
FIG. 1 illustrates a system diagram of a computing device that can be configured to perform the various techniques described herein, according to some embodiments.

FIG. 1 illustrates a block diagram 100 of different components of a computing device 102 configured to implement the various techniques described herein, according to some embodiments. More specifically, FIG. 1 illustrates a high-level overview of the computing device 102, which, as shown, can include a processor 104, a memory 106, and a storage device 112 (e.g., a solid-state drive (SSD)). According to some embodiments, the processor 104 can be configured to work in conjunction with the memory 106 and the storage device 112 to enable the computing device 102 to operate in accordance with this disclosure. For example, the processor 104 can be configured to load an operating system (OS) 108 from the storage device 112 into the memory 106 for execution, where the OS 108 includes a file system manager 110 configured to implement various techniques described herein. Although not illustrated in FIG. 1, it is understood that the OS 108 can be configured to enable a variety of processes to execute on the computing device 102, e.g., OS daemons, native OS applications, user applications, and the like. Additionally, the OS 108 can be configured to enable any process to execute on the computing device 102 that can cause the file system manager 110 to establish and/or modify over-provisioned storage space within the storage device 112.

According to some embodiments, the file system manager 110 can represent logic/information for implementing the techniques described herein. For example, the file system manager 110 can be configured to implement one or more file system volumes 118 that each represents a separate and distinct file system within the computing device 102. According to some embodiments, the one or more file system volumes 118 can be configured to utilize the physical storage space within the storage device 112 (in a non-conflicting/organized manner). This beneficially provides enhanced flexibility as each file system volume 118 can consume storage space within the storage device 112 on an as-needed basis. In addition, each file system volume 118 can be configured to enforce particular configurations (e.g., permissions, ownership, encryption schemes, etc.) independent from the configurations of other file system volumes 118 managed by the file system manager 110.

As shown in FIG. 1, various file system data structures can be associated with a given file system volume 118. According to some embodiments, the file system data structures can be utilized by the file system manager 110 to manage corresponding file system content 130—i.e., actual file data—of the file system volume 118. According to some embodiments, the file system data structures can include (but are not limited to) (1) a file system root structure 120, and (2) a file system extent structure 124. These structures can take the form of any data structure that enables data to be stored in an effective manner, e.g., tree-based data structures. Notably, although it is understood that storing the records in a tree representation enables various operations—e.g., searches, sequential accesses, insertions, deletions, etc.—to be carried out in an efficient manner, the embodiments set forth herein are not limited to tree-based data structures. On the contrary, any data structure can be used to organize and access the records (e.g., lists, arrays, tables, etc.). In any case, as described in greater detail below, these various file system data structures can collectively be utilized by the file system manager 110 to implement the techniques described herein.

According to some embodiments, the file system root structure 120 can include file nodes 122 that describe various aspects of the file system volume 118, e.g., directories, files, metadata associated with the files, and the like. Moreover, the file system extent structure 124 can include file system extent records 126 that can be used to track file extents of file nodes 122 that belong to the file system root structure 120. According to some embodiments, a file system extent record 126 can include a starting logical file offset, a length (in bytes), a physical data block address, and an encryption identifier, among other information. Notably, the file system extent structure 124 can enable the file system manager 110 to track multiple file nodes 122, e.g., multiple file nodes 122 that reference the same data block address(es), thereby enabling cloning techniques to be implemented. Accordingly, the association between the file nodes 122 and the corresponding data block addresses can be stored within the file system extent records 126.

Additionally, as shown in FIG. 1, it is noted that the different file nodes 122 correspond to underlying data stored within the file system content 130. For example, a given file node 122 can correspond to a file 134 (e.g., an operating system file, a user file, etc.). Moreover, a given file node can correspond to a file that is utilized to establish over-provisioned storage space within the storage device 112, which is illustrated in FIG. 1 as an over-provisioning file 132. It is noted that the over-provisioning file 132 is illustrated with dotted lines in order to highlight that the nature of the over-provisioning file 132 can be distinct from the nature of regular files 134. In particular, and as described in greater detail herein, the over-provisioning file 132 can represent a file that the file system manager 110 believes is stored by the storage device 112. However, the techniques described herein effectively cause the storage device 112 to free the storage space that corresponds to the over-provisioning file 132. In this manner, the over-provisioning file 132 remains intact from the perspective of the file system manager 110, and prevents the file system manager 110 from utilizing the storage space assumed to be occupied by the over-provisioning file 132. Conversely, the storage space is free from the perspective of the storage device manager 114, thereby enabling the storage device manager 114 to utilize the storage space to carry out over-provision related operations (e.g., cache space for overwrite operations, data organization, etc.) without interference from the file system manager 110.

Additionally, and as shown in FIG. 1, the storage device 112 can be configured to include a storage device manager 114 that controls the overall operation of the storage device 112. For example, the storage device manager 114 can be configured to process input/output (I/O) requests that are issued by the file system manager 110. As described in greater detail herein, the storage device manager 114 can be configured to utilize over-provisioned storage space within the storage device 112 to effectively carry out write operations, especially as rising levels of stored data diminish the amount of free storage space available within the storage device 112. According to some embodiments, and as shown in FIG. 1, the storage device manager 114 can be configured to implement a storage device allocation structure 116 that can be used to identify free and occupied areas of the storage space within the storage device 112. For example, the storage device manager 114 can be configured to process delete requests—commonly referred to as "trim" requests— that permit the storage device manager 114 overwrite existing data in an active or deferred manner. To facilitate this operation, the storage device manager 114 can be configured to update the storage device allocation structure 116 to identify areas of the storage device 112 to which data can freely be written.

Accordingly, FIG. 1 sets forth a high-level overview of the manner in which the computing device 102 can be configured to implement the various techniques described herein. As described in greater detail below, the various entities executing on the computing device 102—including the file system manager 110 and the storage device manager 114—can operate in concert to establish and/or adjust over-provisioned storage space within the storage device 112 using one or more over-provisioning files 132. Beneficially, this flexible approach can lead to improved performance of the storage device 112 without requiring excess amounts of available storage space to be reserved upfront (e.g., at a time of manufacture) for over-provisioning.

Figure 2A:
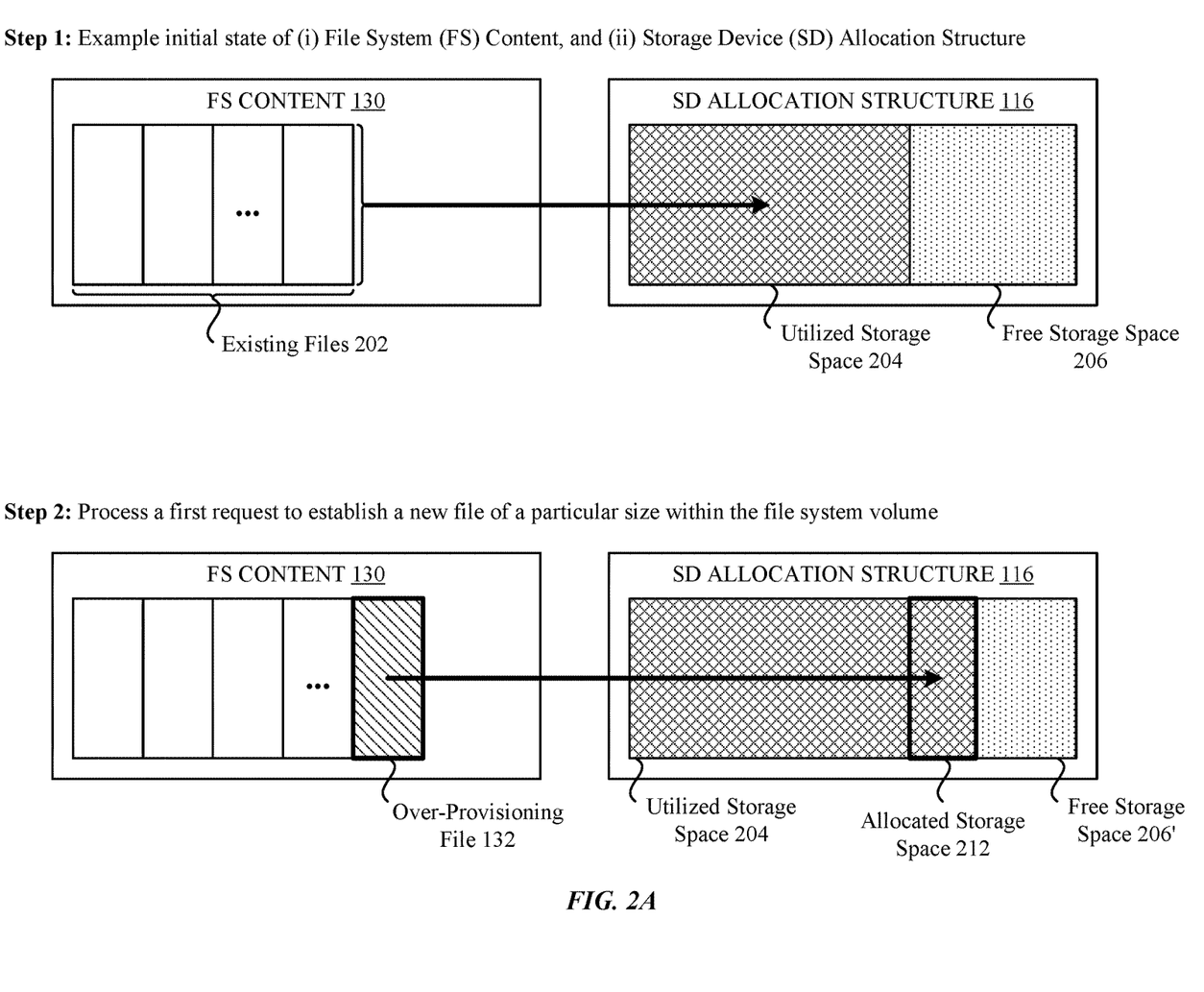
FIGS. 2A-2B illustrate conceptual diagrams that involve establishing over-provisioned storage space within a storage device, according to some embodiments.
Figure 2B:
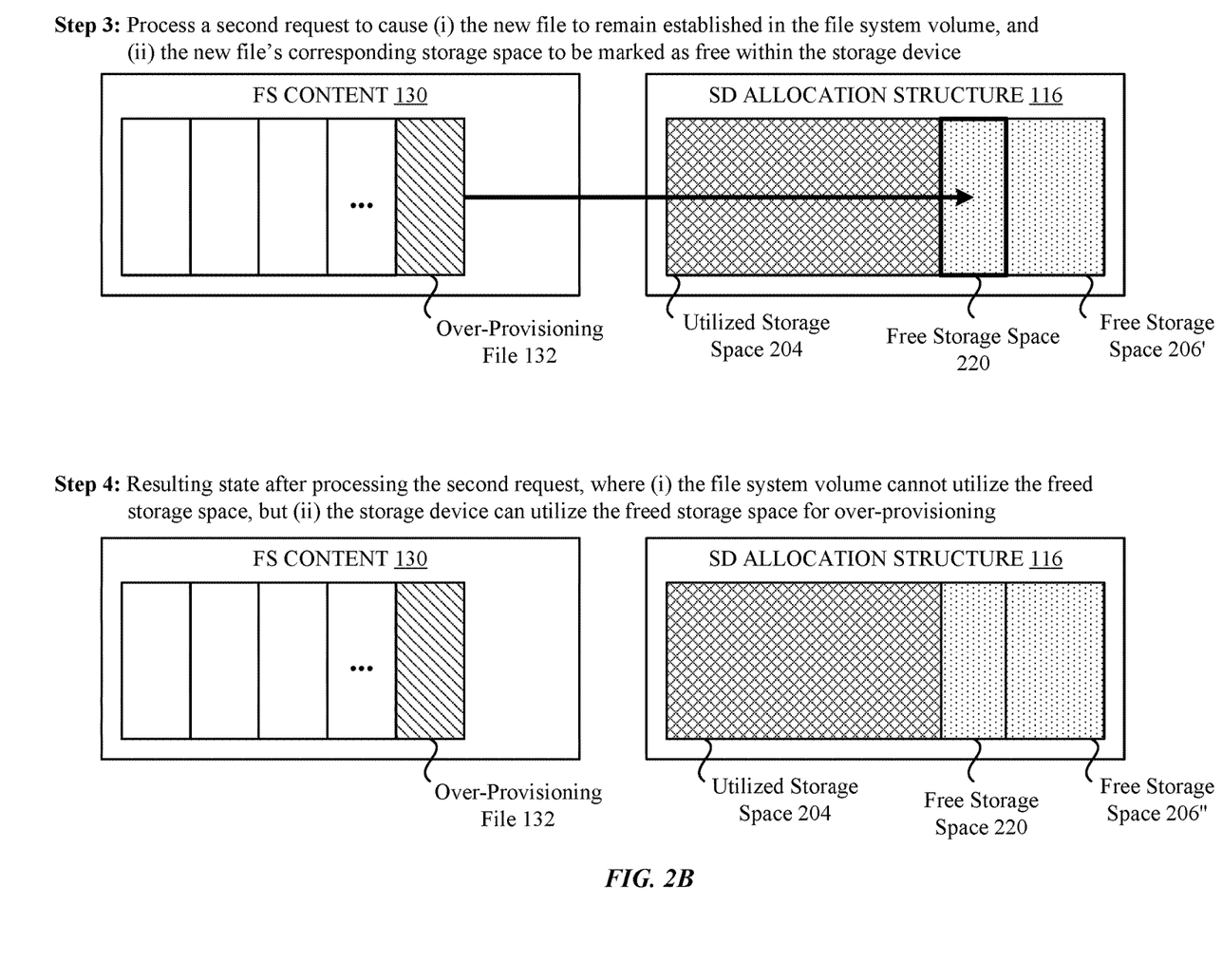

FIGS. 2A-2B illustrate conceptual diagrams that involve establishing over-provisioned storage space within the storage device 112 of FIG. 1, according to some embodiments. As shown in FIG. 2A, a first step illustrates an example initial state of the file system content 130 (managed by the file system manager 110), as well as a corresponding example initial state of the storage device allocation structure 116 (managed by the storage device manager 114). In particular, as shown in FIG. 2A, the file system content 130 can include a collection of existing files 202 (e.g., operating system files, user files, etc.), that are stored across an area of storage space in the storage device 112 that corresponds to utilized storage space 204. Additionally, as shown in FIG. 2A, free storage space 206 exists within the storage device 112 and complements the utilized storage space 204. It is noted that the existing files 202, the utilized storage space 204, and the free storage space 206 are illustrated as being contiguously distributed in the interest of simplifying this disclosure, and that the techniques described herein do not require such contiguity. On the contrary, the techniques described herein can be implemented even when fragmentation occurs within the storage device 112.

In any case, a second step illustrated in FIG. 2A involves the file system manager 110 processing a first request to establish an over-provisioning file 132 of a particular size within the file system content 130. According to some embodiments, and as described in greater detail herein, the first request can be issued in conjunction with a variety of procedures being carried out at the computing device 102. For example, the first request can be issued by any update process associated with the computing device 102 (e.g., an operating system update, an application update, etc.). In another example, the first request can be used by any installation process associated with the computing device 102 (e.g., an operating system installation, an application installation, etc.). It is noted that is not a requirement for the file system manager 110 to receive such a request, and that the file system manager 110 can instead self-invoke the over-provisioning techniques set forth herein. In any case, as shown in FIG. 2A, the second step can involve the file system manager 110 generating the over-provisioning file 132 that corresponds to allocated storage space 212. In turn, the free storage space 206 transitions into the free storage space 206' to reflect the reduction in size that occurs as a result of the allocated storage space 212.

It should be understood the generation of the over-provisioning file 132 can involve several different activities taking place that are being omitted from the illustration of FIG. 2A in the interest of simplifying this disclosure. For example, generating the over-provisioning file 132 can involve the file system manager 110 interacting with the file system volume 118—in particular, the root structure 120/ extent structure 124 of the file system volume 118—to identify a contiguous area of storage space sized in accordance with the size of the over-provisioning file 132 specified in the first request. Alternatively, when a contiguous area of storage space is not available, the file system manager 110 can identify two or more non-contiguous areas of storage space that, together, satisfy the size of the over-provisioning file 132. Additionally, generating the over-provisioning file 132 can involve the storage device manager 114 carrying out I/O operations to reflect the changes to the file system volume 118, as well as updating the storage device allocation structure 116 to reflect the changes. For example, the file system manager 110 can optionally write data into the over-provisioning file 132 to ensure that the storage device manager 114 does not inadvertently repossess all or a portion of the storage space, which might otherwise occur if the over-provisioning file 132 were to remain "empty" (i.e., unfilled with data).

At the conclusion of the second step, both the file system manager 110 and the storage device manager 114 are aware of the existence of the over-provisioning file 132 within the storage device 112. At this juncture, the file system manager 110 can carry out a technique that effectively converts the storage space associated with the over-provisioning file 132 into over-provisioned storage space within the storage device 112. In particular, and as shown in FIG. 2B, a third step can involve the file system manager 110 processing a second request to cause (i) the over-provisioning file 132 to remain established within the file system volume 118, and (ii) the storage space that corresponds to the over-provisioning file 132—i.e., the allocated storage space 212 illustrated in FIG. 2A—to be marked free within the storage device 112. As shown in FIG. 2B, carrying out the foregoing changes can involve the file system manager 110 retaining the over-provisioning file 132 within the file system content 130. Moreover, the changes can involve the storage device manager 114 converting the allocated storage space 212 into free storage space 220.

Accordingly, at a fourth step illustrated in FIG. 2B, over-provisioning of storage space within the storage device 112 is achieved. In particular, the file system manager 110 views the over-provisioning file 132 as present within the file system content 130, and the storage space associated with the over-provisioning file 132 as unavailable for consumption (e.g., to store new files within the file system content 130). Conversely, from the perspective of the storage device manager 114, the allocated storage space 212—which has transitioned into free storage space 220—is free for utilization by the storage device manager 114. As a result, a reserved area of storage space is effectively established within the storage device 112, which can be exploited by the storage device manager 114 to perform a variety of over-provision functions—e.g., cache space for overwrite operations, data organization, etc.—without interference from the file system manager 110.

Accordingly, FIGS. 2A-2B illustrate high-level conceptual diagrams of the manner in which various entities executing on the computing device 102 can establish over-provisioned storage space within the storage device 112. A more detailed breakdown of the manner in which these entities communicate with one another and carry out the techniques set forth herein is provided below in conjunction with FIG. 3.

Figure 3:
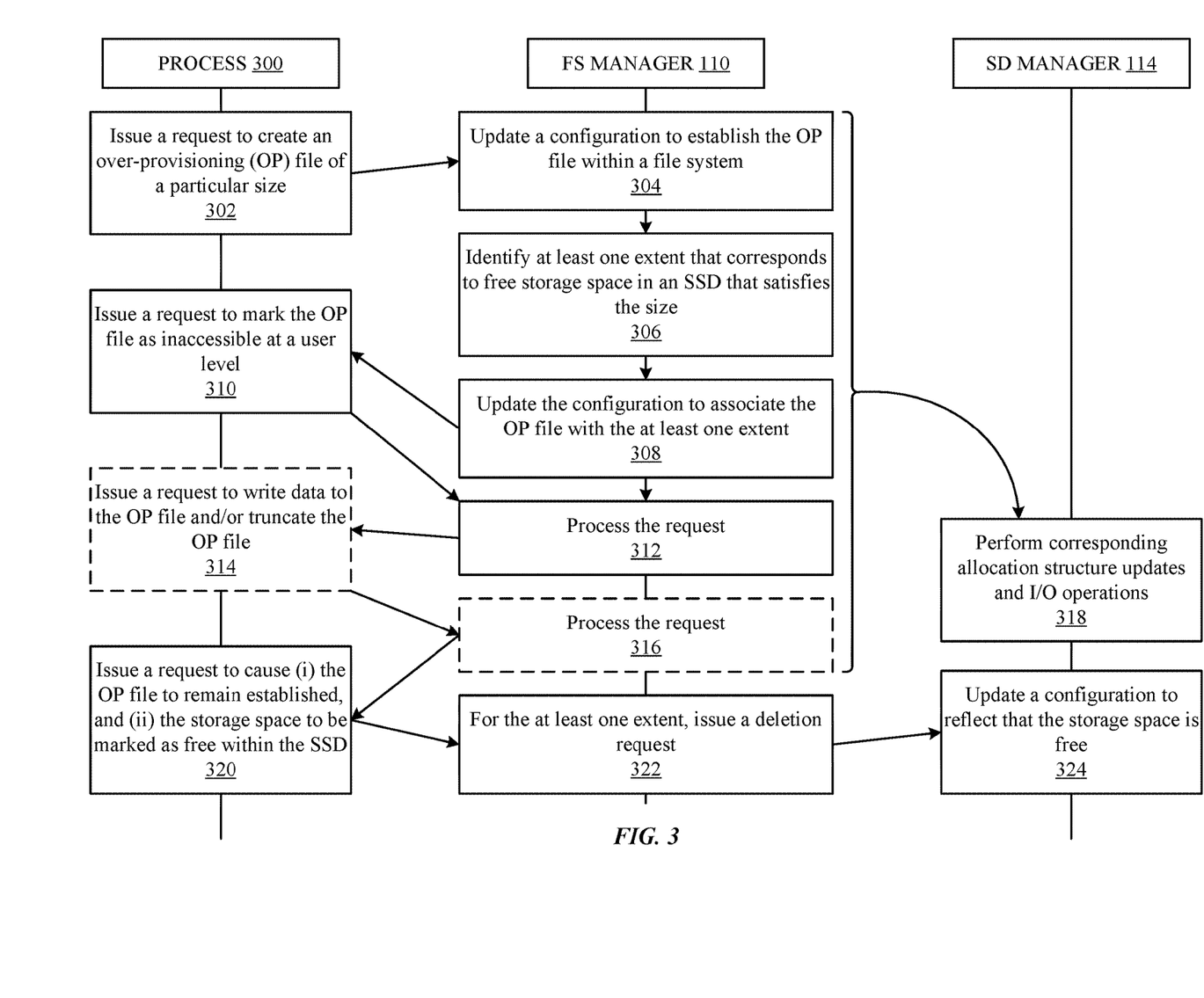
FIG. 3 illustrates a method for establishing over-provisioned storage space within a storage device, according to some embodiments.

FIG. 3 illustrates a method for establishing over-provisioned storage space within the storage device 112 illustrated in FIG. 1, according to some embodiments. As shown in FIG. 3, the method begins at step 302, where a process 300 executing on the computing device 102 issues a request to create an over-provisioning file 132 of a particular size. As previously described herein, the process 300 can represent any installation or update process executing on the computing device 102. It is noted, however, that such a process 300 is not necessarily required to invoke the over-provisioning techniques described herein. On the contrary, the file system manager 110 can be configured to self-invoke the over-provisioning techniques without departing from the scope of this disclosure.

In any case, as shown at step 304 of FIG. 3, the file system manager 110 receives the request issued by the process 300, and updates a configuration to establish the over-provisioning file 132 within a given file system volume 118 in accordance with the particular size specified in the request. According to some embodiments, the file system manager 110 can interact with the file system volume 118—in particular, the root structure 120—to establish an object that represents the over-provisioning file 132. For example, the file system manager 110 can generate a new file node 122 within the root structure 120. In turn, at step 306, the file system manager 110 can interface with the records 126 stored in the extent structure 124 to identify at least one extent that corresponds to free storage space in the storage device 112 that satisfies the size. According to some embodiments, the request can indicate that it is desirable to obtain a contiguous area of storage space within the storage device 112 in conjunction with creating/storing the over-provisioning file 132. In particular, overall performance improvements can be achieved when the storage space—which ultimately will be utilized by the storage device 112 as over-provisioned storage space—is contiguous in nature. However, it is noted that the techniques described herein do not require the storage space to be contiguous in nature. On the contrary, the storage space can be broken into any number of free areas of storage space within the storage device 112 without departing from the scope of this disclosure.

In any case, at step 308, the file system manager 110 updates the configuration to associate the over-provisioning file 132 with the at least one extent identified at step 306. This can involve, for example, associating the file node 122 with at least one record 126 in the extent structure 124. For example, the file node 122 can specify that the over-provisioning file 132 occupies a contiguous span of logical addresses that map to a contiguous span of physical addresses within the storage device 112. In another example, the file node 122 can specify that the over-provisioning file 132 occupies two or more different spans of logical addresses that map to respective spans of physical addresses within the storage device 112.

Next, at step 310, the process 300 issues a request to mark the over-provisioning file 132 as inaccessible at a user level. In turn, at step 312, the file system manager 110 processes the request. According to some embodiments, marking the over-provisioning file 132 as inaccessible at a user level can involve the file system manager 110 updating properties of the file node 122 to mark the over-provisioning file 132 as hidden. Additionally, or alternatively, the file system manager 110 can mark the over-provisioning file 132 as read-only, undeletable, protected (e.g., requiring authentication to access), and so on, to make it difficult for users and/or other processes to modify the over-provisioning file 132. It is noted that the foregoing examples are not meant to represent an exhaustive list of the different properties/behaviors that can be assigned to the over-provisioning file 132, and that any property/behavior can be assigned to the over-provisioning file 132 without departing from the scope of this disclosure.

At step 314, the process 300 issues a request to write data to and/or truncate the over-provisioning file 132. According to some embodiments, this request can be issued to ensure that the storage space intended to be reserved for the over-provisioning file 132 is not inadvertently repossessed by the file system manager 110/storage device manager 114. For example, data can be written to all or a portion of the storage space that corresponds to the over-provisioning file 132 to effectively "fill" the over-provisioning file 132. In this manner, it is less likely that the file system manager 110/storage device manager 114 will identify the over-provisioning file 132 as an "empty" file whose storage space can be fairly repossessed. Moreover, and as mentioned above, the request can also specify a desire to perform a truncation of the over-provisioning file 132 to effectively define a size/endpoint of the over-provisioning file 132, thereby further mitigating the aforementioned repossession issues that can potentially take place. In any case, at step 316, file system manager 110 processes the request issued at step 314. For example, the file system manager 110 can issue I/O operations that cause the binary value of one ("1") to be written to each underlying bit of the over-provisioning file 132, followed by a truncation of the over-provisioning file 132 that effectively establishes a size and endpoint for the over-provisioning file 132.

It is noted that step 318 carried out by the storage device manager 114 is meant to represent the execution of various operations that coincide with steps 302-316 illustrated in FIG. 3 and described herein. In particular, the storage device manager 114 can be configured to update the storage device allocation structure 116—as well as process I/O requests—in accordance with steps 302-316. For example, the storage device manager 114 can be configured to perform storage device allocation structure 116 updates and I/O operations that effectively establish the over-provisioning file 132 within the storage device 112 and cause the over-provisioning file 132 to be inaccessible at a user level (e.g., as described above in conjunction with steps 302-312). Moreover, the storage device manager 114 can be configured to perform storage device allocation structure 116 updates and I/O operations that effectively "fill" the over-provisioning file 132 with data (e.g., as described above in conjunction with steps 314-316).

In any case, step 320 represents a transition point at which the over-provisioning file 132 is modified in a manner that effectively establishes over-provisioned storage space within the storage device 112. In particular, and in accordance with the techniques previously set forth herein, the process 300 issues a request to cause (i) the over-provisioning file 132 to remain established within the file system volume 118, and (ii) the storage space (corresponding to the over-provisioning file 132) to be marked as free within the storage device 112. In turn, and to carry out this request, at step 322, the file system manager 110 identifies the one or more extents associated with the over-provisioning file 132, and issues corresponding (i.e., one or more) deletion requests—e.g., "trim" requests—to the storage device 112. It is noted that the file system manager 110 can be configured to implement techniques to improve operational efficiency. For example, when the over-provisioning file 132 is associated with two or more extents, the file system manager 110 can be configured coalesce the associated deletion requests into fewer deletion requests or even a single deletion request.

In any case, at step 324, the storage device manager 114 updates its configuration to reflect that the storage space is free. This can involve, for example, updating the storage device allocation structure 116 to indicate that any data currently stored in the storage space—i.e., the underlying data of the over-provisioning file 132—can be erased and utilized by the storage device 112 as over-provisioned storage space. Accordingly, at the conclusion of step 324, the over-provisioning file 132 remains established from the perspective of the file system manager 110, thereby preventing the associated storage space from being utilized by the file system manager 110 (e.g., to store new data). Conversely, the storage space is free from the perspective of the storage device 112, thereby enabling the storage device 112 to utilize the storage space for over-provision related operations (e.g., cache space for overwrite operations, data organization, etc.) without interference from the file system manager 110.

Additionally, and as previously mentioned herein, the size of the over-provisioning file 132 can, at a later time, be modified to flexibly increase or decrease the amount of corresponding over-provisioned storage space within the storage device 112. For example, the process 300 (or other process, including the file system manager 110 itself) can issue a request to the file system manager 110 to increase the size of the over-provisioning file 132 (with the intent of increasing the size of the over-provisioned storage space). In turn, the file system manager 110 can identify at least one additional extent that can accommodate the increased storage space, and associate the at least one additional extent with the over-provisioning file 132. It is noted that such an operation will cause the storage device manager 114 to view the added storage space that corresponds to the at least one additional extent as occupied storage space, thereby preventing the storage device manager 114 from being capable of utilizing the added storage space for over-provisioning. To mitigate this issue, the file system manager 110 can issue one or more delete requests directed to the at least one additional extent without eliminating the association between the over-provisioning file 132 and the at least one additional extent. In this manner, the enlarged over-provisioning file 132 remains established from the perspective of the file system manager 110, thereby preventing the added storage space from being utilized by the file system manager 110. Conversely, the added storage space is free from the perspective of the storage device 112, thereby enabling the storage device 112 to utilize the added storage space for over-provision related operations without interference from the file system manager 110.

Additionally, as noted above, the process 300 (or other process, including the file system manager 110 itself) can issue a request to the file system manager 110 to decrease the size of the over-provisioning file 132. In turn, the file system manager 110 can modify the one or more extents associated with the over-provisioning file 132 in accordance with the amount by which the size of the over-provisioning file 132 is to be decreased. As a result, unused extents are formed and can be freed within the file system volume 118. To effect this change, the file system manager 110 can be configured to update its corresponding data structures (e.g., the root structure 120/extent structure 124) to indicate that the freed extents are now available for use (e.g., to store OS 108/user data). Moreover, the file system manager 110 can forego issuing corresponding updates to the storage device manager 114, as the storage space that corresponds to the freed extents is already viewed as free storage space by the storage device manager 114 in accordance with the previous over-provisioning techniques that took place in association with the over-provisioning file 132.

Additionally, it is noted that the techniques set forth herein are not limited to implementing only a single over-provisioning file 132. On the contrary, any number of over-provisioning files 132 can be established in accordance with desired operational parameters. For example, two different over-provisioning files 132 can be established—e.g., one large, and one small—such that the small over-provisioning file 132 (and its underlying storage space) can efficiently be eliminated (and returned to OS/user-accessible storage space) without necessitating the aforementioned resizing procedures. Moreover, it is noted that fragmented over-provisioning files 132—e.g., those associated with numerous extents—can be reorganized to improve overall contiguity when free areas of contiguous storage space become available within the storage device 112. Alternatively, these fragmented over-provisioning files 132 can be eliminated and reformed when free areas of contiguous storage space become available within the storage device.

Figure 4:
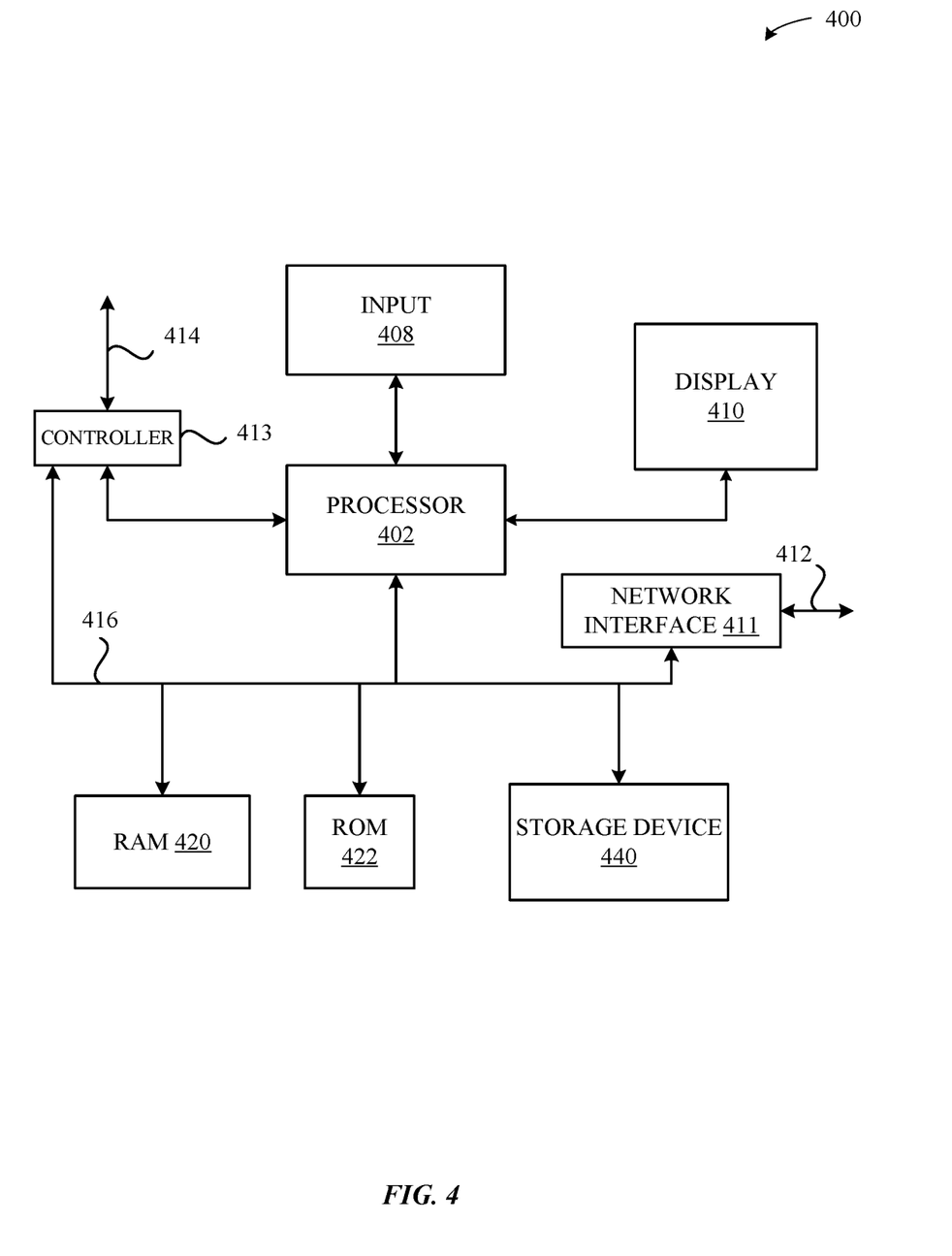
FIG. 4 illustrates a detailed view of a computing device that can be used to implement the various techniques described herein, according to some embodiments.

FIG. 4 illustrates a detailed view of a computing device 400 that can be used to implement the various techniques described herein, according to some embodiments. In particular, the detailed view illustrates various components that can be included in the computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid-state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for over-provisioning storage space within a solid-state storage device (SSD), the method comprising, by a file system executing on a computing device with which the SSD is communicably coupled:
receiving a first request to create a file, wherein the first request includes a size for the file;
establishing the file within the file system by:
identifying at least one extent that corresponds to an area of storage space within the SSD that satisfies the size for the file, and
associating the file with the at least one extent to indicate that the storage space is occupied;
writing at least some data into the area of storage space; and
in response to receiving a second request:
causing the file to remain established within the file system such that the at least one extent associated with the file cannot be re-used by the file system for storage of other files, and
also causing the area of storage space that corresponds to the at least one extent to be marked free within the SSD such that the at least some data is deleted and the area of storage space can be utilized for over-provisioning without interference from the file system.

2. The method of claim 1, wherein the first request includes a flag that indicates:
a preference for the file to be associated with only one extent, and
a preference for the file to be inaccessible at a user level.

3. The method of claim 2, wherein, when the area of storage space cannot be allocated using only one extent, the at least one extent includes two or more extents that correspond to the area of storage space.

4. The method of claim 1, wherein causing the file to remain established within the file system comprises:
suppressing any actions that would otherwise cause the file to be removed from the file system.

5. The method of claim 1, wherein the file is established within the SSD in response to receiving a write request to populate the file with data.

6. The method of claim 5, further comprising, subsequent to identifying the at least one extent:
receiving a truncate request directed to the file;
causing any write operations to the file to cease; and
causing properties associated with the file to indicate that the file is sized in accordance with the truncate request.

7. The method of claim 1, further comprising:
receiving a fourth request to increase the size of the file;
associating the file with at least one additional extent that corresponds to additional storage space that satisfies the increased size of the file; and issuing, to the SSD, a fifth request that causes the additional storage space that corresponds to the at least one additional extent to be marked free within the SSD.

8. A non-transitory computer readable storage medium configured to store instructions that, when executed by at least one processor included in a computing device, cause the computing device to implement a file system that establishes over-provisioned storage space within a solid-state storage device (SSD), by carrying out steps that include:
receiving a first request to create a file, wherein the first request includes a size for the file;
establishing the file within the file system by:
identifying at least one extent that corresponds to an area of storage space within the SSD that satisfies the size for the file, and
associating the file with the at least one extent to indicate that the storage space is occupied;
writing at least some data into the area of storage space; and
in response to receiving a second request:
causing the file to remain established within the file system such that the at least one extent associated with the file cannot be re-used by the file system for storage of other files, and
also causing the area of storage space that corresponds to the at least one extent to be marked free within the SSD such that the at least some data is deleted and the area of storage space can be utilized for over-provisioning without interference from the file system.

9. The non-transitory computer readable storage medium of claim 8, wherein the first request includes a flag that indicates:
a preference for the file to be associated with only one extent, and
a preference for the file to be inaccessible at a user level.

10. The non-transitory computer readable storage medium of claim 9, wherein, when the area of storage space cannot be allocated using only one extent, the at least one extent includes two or more extents that correspond to the area of storage space.

11. The non-transitory computer readable storage medium of claim 8, wherein causing the file to remain established within the file system comprises:
suppressing any actions that would otherwise cause the file to be removed from the file system.

12. The non-transitory computer readable storage medium of claim 8, wherein the file is established within the SSD in response to receiving a write request to populate the file with data.

13. The non-transitory computer readable storage medium of claim 12, wherein the steps further include, subsequent to identifying the at least one extent:
receiving a truncate request directed to the file;
causing any write operations to the file to cease; and
causing properties associated with the file to indicate that the file is sized in accordance with the truncate request.

14. The non-transitory computer readable storage medium of claim 8, wherein the steps further include:
receiving a fourth request to increase the size of the file;
associating the file with at least one additional extent that corresponds to additional storage space that satisfies the increased size of the file; and issuing, to the SSD, a fifth request that causes the additional storage space that corresponds to the at least one additional extent to be marked free within the SSD.

15. A computing device configured to over-provision storage space within a solid-state storage device (SSD), the computing device comprising:
at least one processor; and
at least one memory storing instructions that, when executed by the at least one processor, cause the computing device to implement a file system configured to:
receive a first request to create a file, wherein the first request includes a size for the file;
establish the file within the file system by:
identifying at least one extent that corresponds to an area of storage space within the SSD that satisfies the size for the file, and
associating the file with the at least one extent to indicate that the storage space is occupied;
write at least some data into the area of storage space; and
in response to receiving a second request:
cause the file to remain established within the file system such that the at least one extent associated with the file cannot be re-used by the file system for storage of other files, and
also cause the area of storage space that corresponds to the at least one extent to be marked free within the SSD such that the at least some data is deleted and the area of storage space can be utilized for over-provisioning without interference from the file system.

16. The computing device of claim 15, wherein the first request includes a flag that indicates:
a preference for the file to be associated with only one extent, and
a preference for the file to be inaccessible at a user level.

17. The computing device of claim 16, wherein, when the area of storage space cannot be allocated using only one extent, the at least one extent includes two or more extents that correspond to the area of storage space.

18. The computing device of claim 15, wherein causing the file to remain established within the file system comprises:
suppressing any actions that would otherwise cause the file to be removed from the file system.

19. The computing device of claim 15, wherein the file is established within the SSD in response to receiving a write request to populate the file with data.

20. The computing device of claim 19, wherein the at least one processor further causes the computing device to, subsequent to identifying the at least one extent:
receive a truncate request directed to the file;
cause any write operations to the file to cease; and
cause properties associated with the file to indicate that the file is sized in accordance with the truncate request.

* * * * *